US007082399B2

(12) United States Patent
Utsumi

(10) Patent No.: US 7,082,399 B2
(45) Date of Patent: Jul. 25, 2006

(54) INFORMATION PROVIDING APPARATUS, SERVER APPARATUS AND INFORMATION PROCESSING METHOD

(75) Inventor: Yoshimasa Utsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 827 days.

(21) Appl. No.: 09/858,172

(22) Filed: May 15, 2001

(65) Prior Publication Data

US 2002/0007282 A1    Jan. 17, 2002

(30) Foreign Application Priority Data

May 16, 2000    (JP)    ............................. 2000-148650

(51) Int. Cl.
    *G06Q 99/00*    (2006.01)
(52) U.S. Cl. .................. 705/1; 707/1; 705/53; 705/57; 705/59
(58) Field of Classification Search ..................... None
    See application file for complete search history.

(56) References Cited

U.S. PATENT DOCUMENTS 5,862,260 A *  1/1999  Rhoads ........................ 382/232
6,289,341 B1*  9/2001  Barney ........................... 707/6
6,658,401 B1* 12/2003  Utsumi et al. ................. 707/1

FOREIGN PATENT DOCUMENTS

EP    0969668 A2 *  6/1999

OTHER PUBLICATIONS www.firstuse.com any linkage 1999.*
Lexis article; "Snitching for Dollars: The economics and Public Policy of Federal Civil Bounty Programs"; 1999; Ferziger, Marsha.*
Lexis article: "The Private Policy"; Apr. 1999, David Sklansky. □□*
Proquest article: Tulsa's World; Aug. 1, 1996; "Tulsa's Most Wanted Listed on web sites"□□.*
Proquest article; National Post; "Ads Hit home: Stop domestic violence: Crime stoppers campaign" Oct. 27, 1999.*
Proquest article: USA Today; Jan. 30, 1997. "Rewards Police lines often clogged with False, unreliable clues" Kelley, Jack.*

* cited by examiner

*Primary Examiner*—John G. Weiss
*Assistant Examiner*—Traci L. Smith
(74) *Attorney, Agent, or Firm*—Frommer Lawrence & Haug LLP; William S. Frommer

(57) ABSTRACT

A charging system is provided which solicits from third parties information about products supposedly infringing on a right holder's lawful right and which, upon exposure of the infringement, acquires royalty revenues from the trespassing party for a reimbursement to any third party having contributed the information on the infringement, whereby right-related information is collected more efficiently and a market on which such information circulates is actively promoted.

12 Claims, 7 Drawing Sheets

FIG. 2 http://www.*****.com/   — 11

| PATENT NUMBER | TECHNICAL FIELD | PRODUCT FIELD | FILING DATE | CLAIMS |
|---|---|---|---|---|
| · JP△○×□□× | CHEMISTRY | COLD REMEDY | 1992.03.05 | ...... |
| · USP△○□□△○○○ | ELECTRICITY | MEMORY CARD | 1989.04.04 | ...... |
| · EP□□□△○○○□ | MACHINERY | MOTOR | 1993.08.02 | ...... | mail to:XYZXYZ@*****.com

[ English ]  [ French ]  [ German ]  [ Italian ]
    16         17          18          19

FIG. 3

PATENT NUMBER
E P☐☐△○○○☐

· INFORMATION PROVIDER'S MAIL ADDRESS : ⎯⎯ 21

· INFORMATION PROVIDER'S BANK ACCOUNT NO.: ⎯⎯ 22

· CONTENTS OF PROVIDED INFORMATION :

⎯⎯ 23

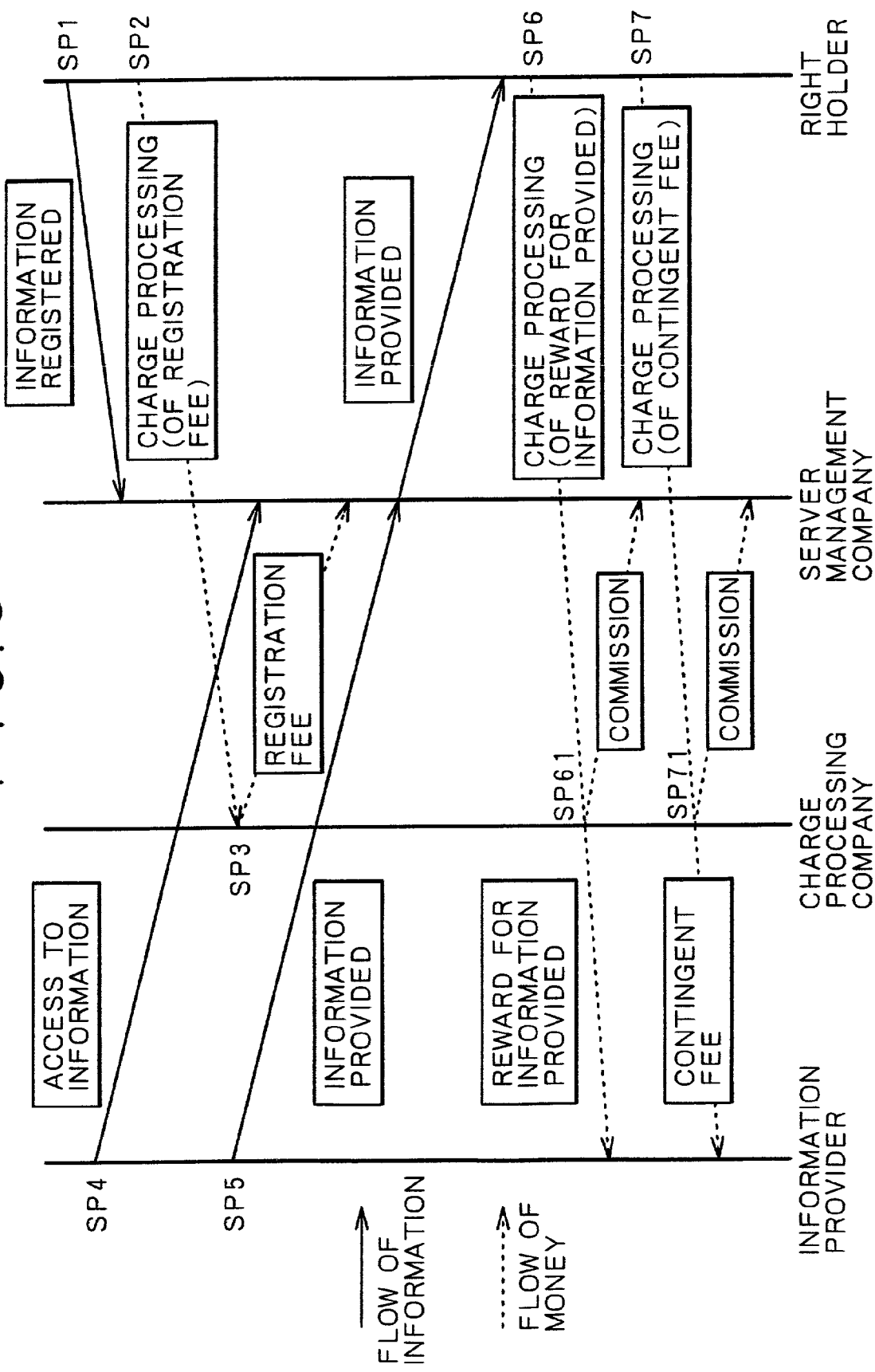

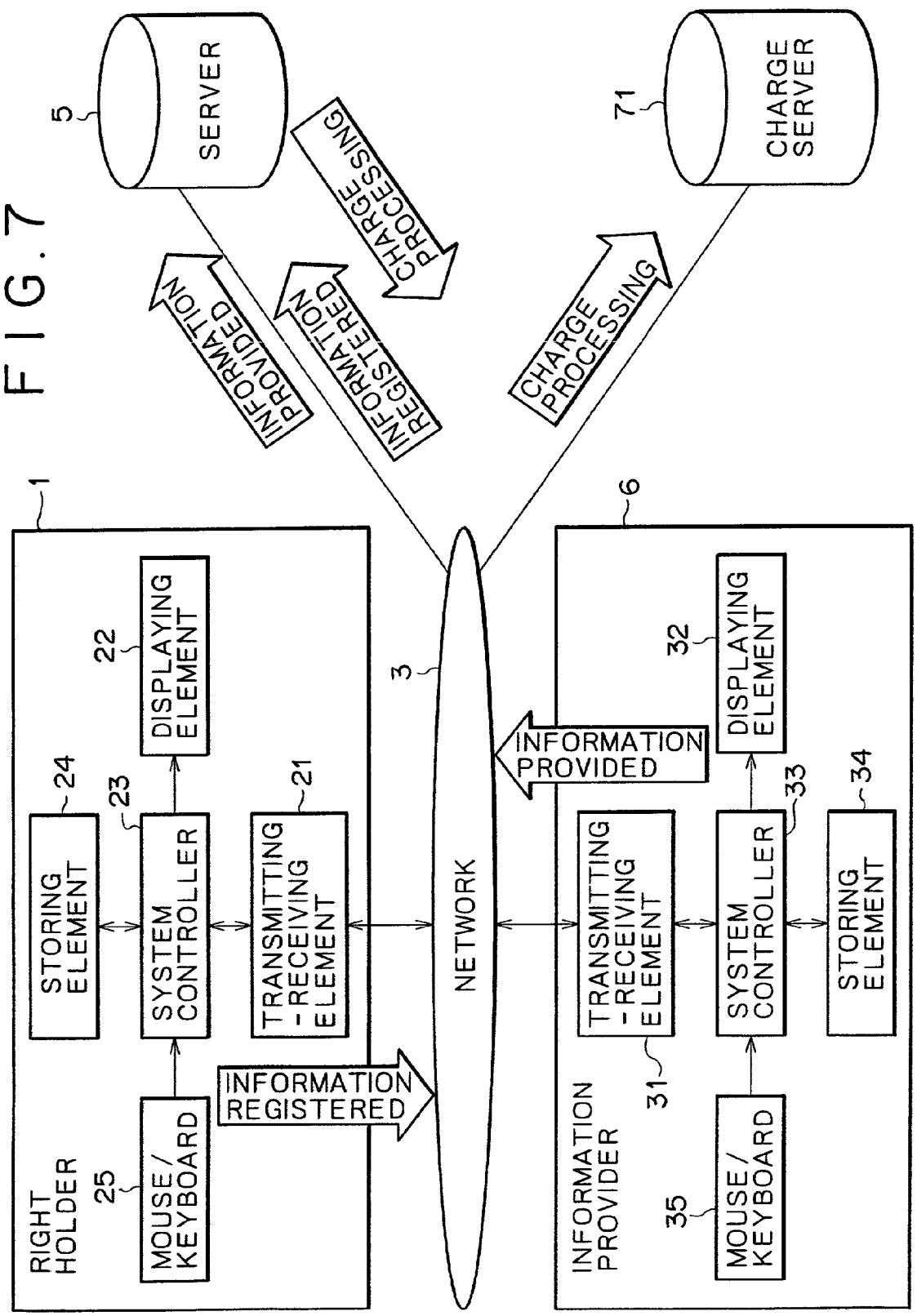

INFORMATION PROVIDING APPARATUS, SERVER APPARATUS AND INFORMATION PROCESSING METHOD

BACKGROUND OF THE INVENTION

The present invention relates to an information providing apparatus, a server apparatus and an information processing method for actively stimulating the circulation of information.

Right holders in possession of patents, utility models, trademarks, designs, copyrights, etc., are able to acquire royalties by granting licenses to others while protecting their businesses, products and creations through their rights. Upon coming across any party infringing on their rights, the right holders may issue warnings to the party in question and/or file a lawsuit with the court in order to protect their rights and increase their royalty earnings.

When looking for information indicative of any infringement on his rights, a right holder typically must purchase, disassemble and study any product suspected of infringing on the rights in question. The right holder must further interpret legally the relations between the scope of his rights and the supposedly infringing product. The proceedings involved are difficult to pursue by the right holder trying to prove the infringement to a third party.

In particular, it takes specialized technical and legal knowledge to analyze the relations between the product at issue and the scope of the right holder's rights. The prospect of having to acquire that knowledge or relevant expertise has often dissuaded the right holder from exercising his rights even if the rights have been legitimately acquired.

These difficulties have discouraged smooth circulation and effective utilization of right holders' lawful rights.

SUMMARY OF THE INVENTION

The present invention has been made in view of the above circumstances and provides an information providing apparatus, a server apparatus and an information processing method for constituting a system allowing right holders to disclose their rights (patents, utility models, trademarks, copyrights, designs, etc.) extensively over the Internet or through like means in order to solicit information from around the world about possible infringement on their rights by any companies, products, claim charts, etc., so that even individuals not well-versed in legalese or technical expertise may get their rights easily exercised and protected, effectively utilized, and more extensively circulated than before.

In carrying out the invention and according to one aspect thereof, there is provided an information providing apparatus comprising: a first receiving element for receiving information about a right held by a registered party, and information for charge processing with regard to the registered party; a storing element for storing the information which is entered by the registered party about the right and which is received by the first receiving element; a transmitting element for readably transmitting to the general public the information stored in the storing element with regard to the right held by the registered party; a second receiving element for receiving information transmitted by a reader concerning possible infringement on the right; and a charge processing element for effecting charge processing regarding the registered party based on the information for charge processing received by the first receiving element with respect to the registered party. Illustratively, if the registered party gains benefits from the right through the use of the infringement-related information provided by the reader, then the charge processing element may perform charge processing to have a contingent fee paid by the registered party.

According to another aspect of the invention, there is provided a server apparatus comprising: a first receiving element for receiving information about a right held by a registered party; a storing element for storing the information about the right received by the first receiving element; a first transmitting element for readably transmitting to the general public the information stored in the storing element with regard to the right held by the registered party; a second receiving element for receiving information transmitted by a reader concerning possible infringement on the right; and a second transmitting element for notifying a charge processing organization to effect charge processing regarding the registered party. Illustratively, if the registered party gains benefits from the right through the use of the infringement-related information provided by the reader, then the second transmitting element may notify the charge processing organization to perform charge processing to have a contingent fee paid by the registered party.

According to a further aspect of the invention, there is provided an information processing method for allowing a registered party to register with a server a right held by the registered party in order to solicit information from readers reading about the right, the method comprising the steps of: transmitting readably to the general public information about the right registered with the server by the registered party; receiving information transmitted by a reader concerning possible infringement on the right registered with the server by the registered party; and if the registered party gains benefits from the right through the use of the infringement-related information provided by the reader, then notifying a charge processing organization to perform charge processing to have a contingent fee paid by the registered party.

The information providing apparatus, server apparatus and information processing method according to the invention constitute a system that allows right holders to collect information about possible infringement on their rights such as patents more efficiently than before.

Other objects, features and advantages of the invention will become more apparent upon a reading of the following description and appended drawings.

BRIEF DESCRIPTION OF THE DRAWINGS

FIG. 2 is a schematic view of a website display screen set up by a server management company in a manner readable by potential information providers;

FIG. 3 is a schematic view of an input screen into which an information provider can make entries with a view to offering information in his or her possession;

FIG. 6, is a transaction diagram sketching flows of information and money within the embodiment; and FIG. 7 is a block diagram sketching a typical hardware structure of the embodiment.

DETAILED DESCRIPTION OF THE PREFERRED EMBODIMENTS

One preferred embodiment of this invention will now be described with reference to the accompanying drawings. The embodiment forms a system allowing right holders to collect information about possible infringement on their rights such as patents.

Figure 1:
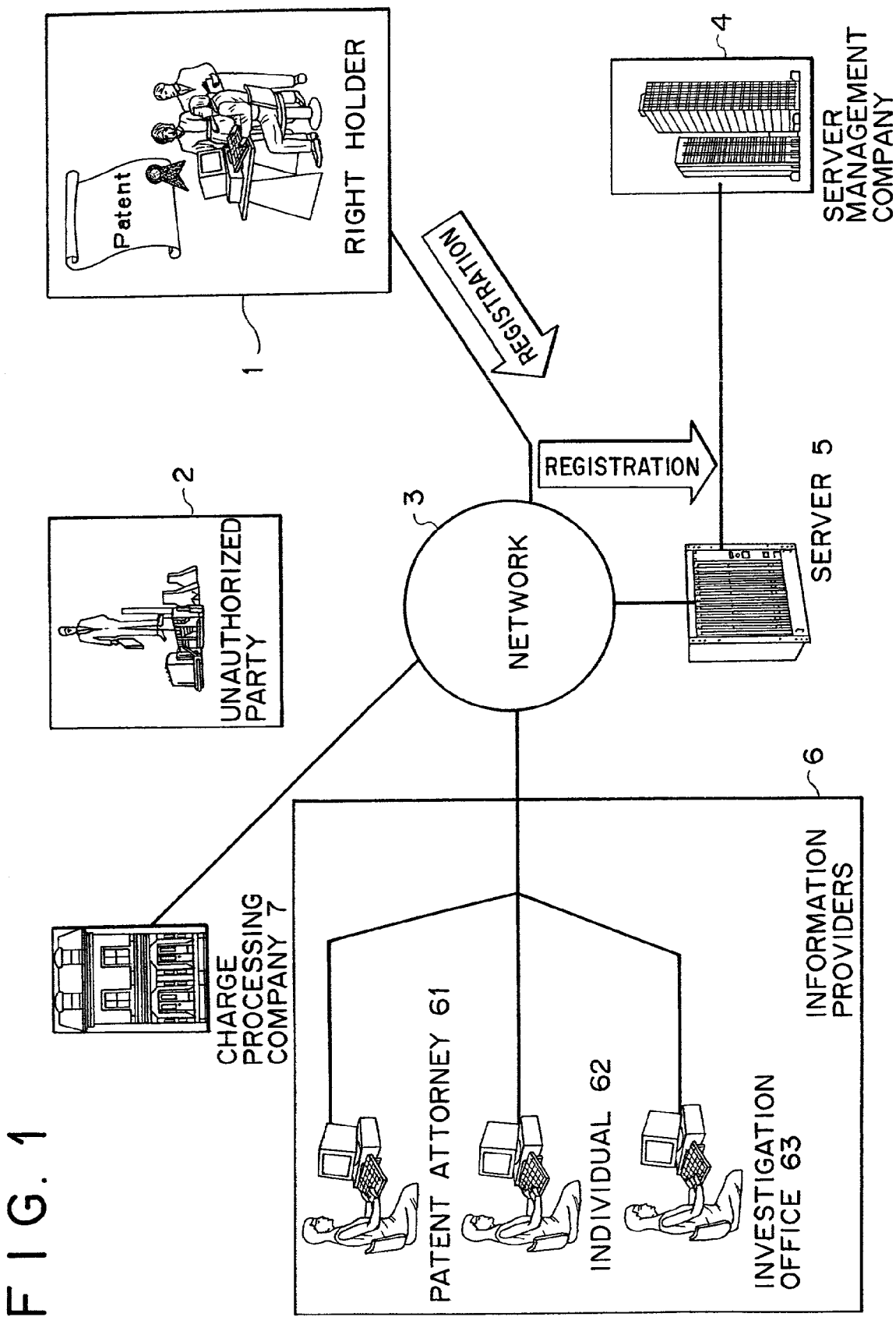
FIG. 1 is a schematic view showing an overall structure of a system practiced as one preferred embodiment of this invention.

FIG. 1 schematically shows an overall structure of a typical system embodying this invention. In FIG. 1, a right holder 1 represents a person or an entity in possession of intellectual property rights such as patents, utility models, trademarks, designs or copyrights. An unauthorized party 2 denotes a person or an entity that is supposedly infringing on any of the rights possessed by the right holder 1. It is assumed that the right holder 1 is at first unaware of his or her right being infringed on by the unauthorized party 2.

A server 5, a server management company 4 and a charge processing company 7 transmit and receive information to and from the general public including right holders 1 over a network (communication lines and transmission channels) 3. In so doing, these social structures carry out processes desired by registered parties (right holders 1).

Information providers 6 are those who browse information over the network 3. They are people who may be able to provide the right holder 1 with useful information, particularly information about possible infringement on right holders' lawful rights by unauthorized parties 2. Anyone—specialist or layman—can become an information provider 6, including a patent attorney 61, an individual 62 or an investigation office 63.

The server management company 4 is a system that runs websites on the Internet so as to mediate between right holders 1 who seek pertinent information and information providers 6 who may offer what is being looked for.

Suppose now that a right holder 1 wishes to know whether any of his patent, utility model, trademark, design, copyright or any other intellectual property right is being infringed on by others. In that case, the right holder enters into the server 5 of the server management company 4 over the network 3 pertinent information concerning his right (patent, trademark, design, copyright, etc.). In other words, the right holder 1 registers with the server 5 in order to solicit extensively from the general public any information about possible infringement on his right, e.g., about whether any company is manufacturing and/or marketing products that can infringe on the right in question.

Specifically, by use of a terminal such as a personal computer (not shown) connected to the network 3, the right holder 1 enters into the server 5 information about, say, a patent right including an application number, an unexamined publication number, a registration number, the right holder's name, a technical field, an abstract, and claims of the patent in question. Publications registered with the patent office may also be disclosed at a website.

Communication lines constituting the network 3 may include ISDN (Integrated Service Digital Network), analog lines, public switched lines, satellite links, and mobile phone channels.

Through the terminal, the right holder 1 also enters such information as his name as an individual or as a company, a phone number, an e-mail address, a credit card number, and/or a bank account number. The information is registered as well with the charge processing company 7 that operates in coordination with the server 5 or server management company 4.

The charge processing company 7 processes a registration fee that the right holder 1 pays to the server management company 4 in accordance with the credit card number or bank account number entered above. In this case, part of the amount paid by the right holder 1 may be appropriated as a commission to the charge processing company 7.

Through processing of the charge processing company 7, the registration fees paid illustratively from bank accounts of the right holders 1 are appropriated as operating costs to the server management company 4.

The data entered by the right holder 1 with regard to his right are disclosed at a website run by the server management company 4. Preferably, the data are disclosed after being edited in several languages by the server management company 4 so that people all over the world may read about them. In this setup, useful information about the disclosed right, such as whistle-blowing information pointing to possible infringement on the right, is solicited globally.

The server management company 4 discloses at its website part or all of the information about the right in question so that any third party may gain access to it over the Internet. The information is disclosed at the website illustratively as shown in FIG. 2.

An input window 11 shows a URL (Uniform Resource Locator) address of the website run by the server management company 4. A main display area 12 includes regions 13, 14 and 15 indicating specific rights such as patents registered by right holders 1, along with patent numbers, technical fields, product fields, filing dates, and claims. Link keys, not shown, linked illustratively to patent gazettes detailing the registered rights may also be included.

Keys 16, 17, 18, 19, etc., are provided corresponding to such languages as English, French, German and Italian. Using a mouse, readers who speak one of these languages may click on the key of the familiar language to go to the pages describing the same contents of FIG. 2 in the language selected.

A reader browsing the website may click on one of the portions indicative of the registered rights (e.g., an underlined portion) by use of the mouse. The click action brings about an input screen shown in FIG. 3 through which information about the clicked-on right may be offered.

Upon accessing the website run by the server management company 4, an information provider 6 reads information about the registered rights as well as information solicited by those who have registered with the website, as shown in FIG. 2. Based on the information thus read, the information provider 6 determines whether the information, product, etc., in his possession involves an infringement on any of the rights listed at the website. If the information provider 6 judges the information or material in his possession to be useful or wishes to investigate the matter further on his own, the information provider 6 may notify by e-mail the server management company 4 of his willingness to provide the information or to investigate, or may put a posting at the website saying that he is in possession of potentially useful material.

When putting a posting at the website reporting the possession of pertinent information, the information provider 6 first clicks on the underlined portion of any one of the registered rights in the screen of FIG. 2 using the mouse or the like. This brings about the information provider's input screen of FIG. 3.

The screen of FIG. 3 is principally made up of three windows: a mail address input window 21 to which to write an e-mail address for allowing the information provider 6 to communicate with the server management company 4; an account number input screen 22 that accommodates a bank account number or a credit card number of the information provider 6—the number representing the account to which a consideration or a contingent fee for the provided information is transferred as will be described later; and a detailed information input window 23 in which to write detailed information to be offered. The information provider 6 expresses his willingness to provide information in the input window 23 or writes the information itself in the window for transmission to the server management company 4.

Figure 4:
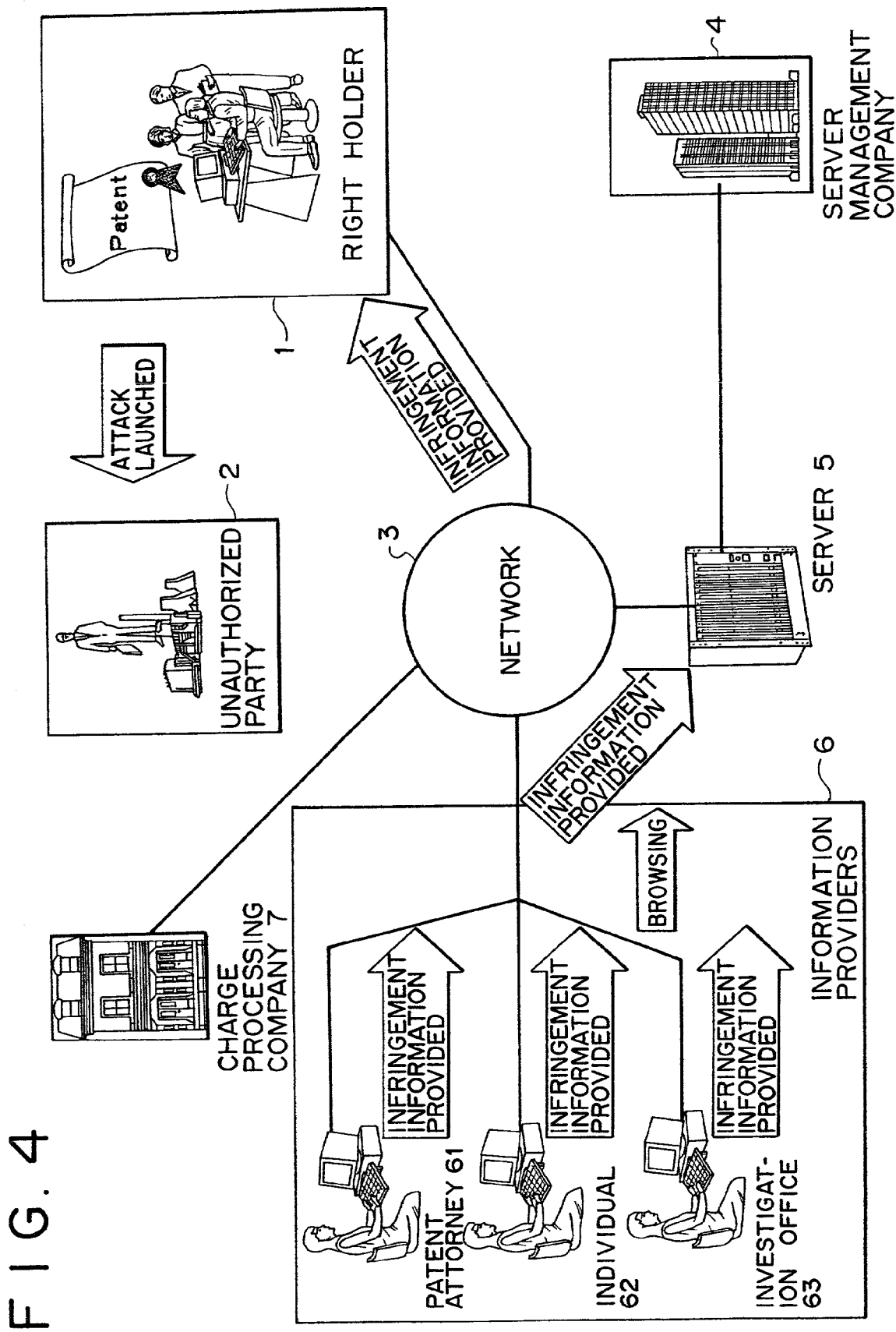
FIG. 4 is a schematic view showing flows of information within the embodiment.
Figure 5:
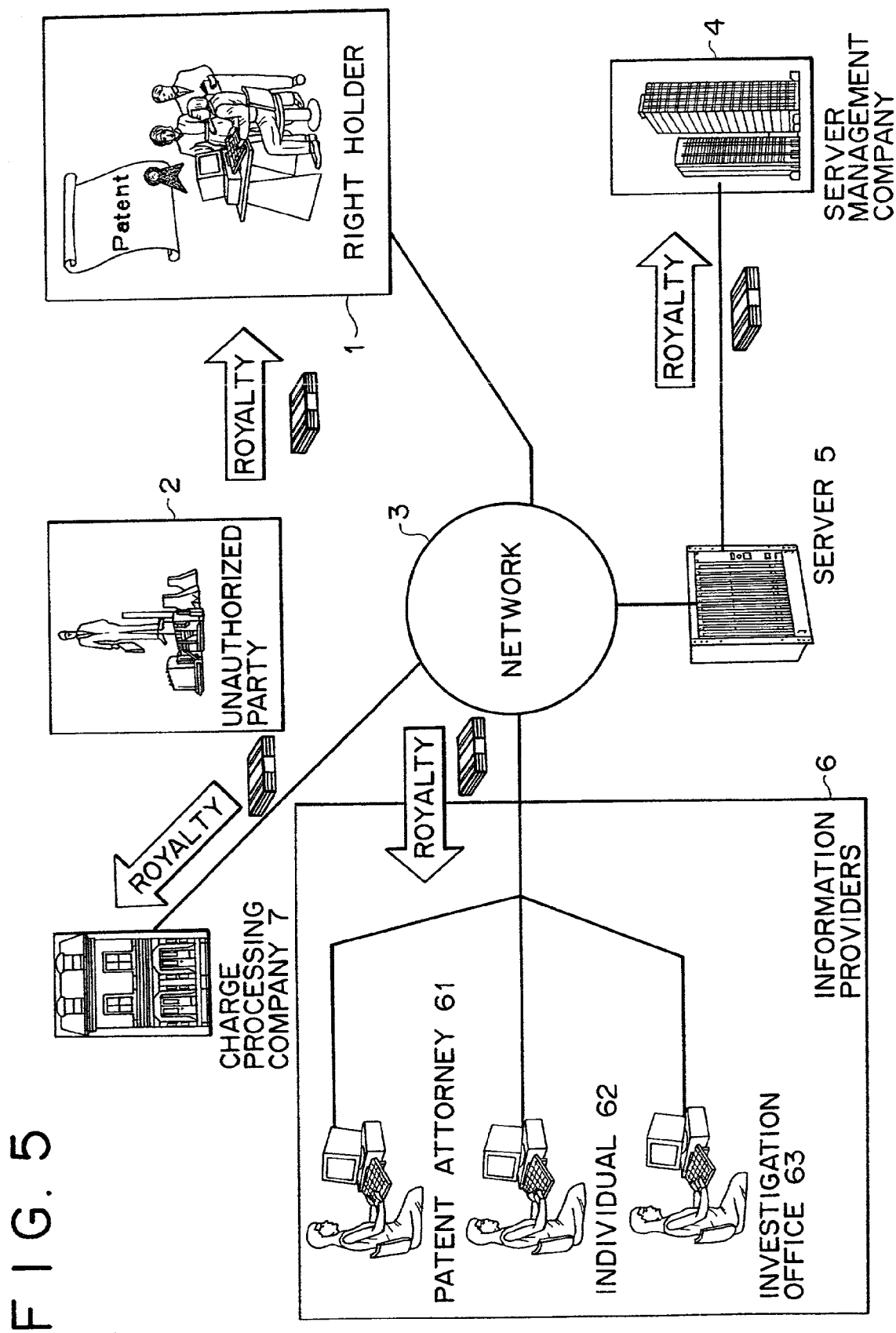
FIG. 5 is a schematic view depicting flows of money within the embodiment.

The information about infringement or the willingness to provide such information, entered or expressed by the information provider 6, is sent over the network 3 to the server 5 of the server management company 4 for registration therewith, as shown in FIG. 4.

Upon detecting the arrival of an e-mail or a posting at the website from the information provider 6 expressing his willingness to provide information, the server management company 4 notifies by e-mail or by telephone the right holder 1 in question that the mail or posting has arrived. Alternatively, the right holder 1 may gain access to the website so as to receive the postings.

The server 5 may require that the right holder 1 input a password or a log-in name before receiving the postings. This measure may be instituted to keep any unscrupulous parties from knowing whether there are any information providers 6 willing to provide information about specific rights or expressing their willingness to offer such information.

Alternatively, information providers 6 may be allowed directly to notify the right holder 1 illustratively by e-mail of their willingness to provide information or of the relevant information itself in their possession.

The right holder 1 acquires information (documents, materials, products, etc.) directly from the information provider 6 or by way of the server management company 4. The right holder 1 then determines whether the information is sufficient to substantiate an infringement on his right. If the information is judged relevant, the right holder 1 will launch an attack on the right-dispossessed party 2 infringing on the right, illustratively by issuing a warning to the party 2 and/or filing a lawsuit with the court.

Once the relevant information is offered to the right holder 1, the right holder 1 may pay a reward to the information provider 6 for the offered information via the server management company 4. The payment may be made alternatively as soon as the information is judged to be useful. In any case, the charge processing company 7 processes the payment by the right holder 1 illustratively through a money transfer from the right holder's bank account to that of the information provider 6.

The amount of the reward for the information provided may be determined by patent attorneys and lawyers of the server management company 4 evaluating the information offered by the information provider 6 (e.g., whether the information is effective or not in substantiating the infringement). Alternatively, a fixed amount may be paid to the information provider 6 for the information offered.

Whereas the reward for the information provided is paid by the right holder 1 to the information provider 6, part of the amount disbursed by the right holder 1 may be appropriated as a commission to the charge processing company 7 and/or to the server management company 4. The server management company 4 may also consider receiving from the right holder 1 fees for the patent attorneys and lawyers for evaluating the offered information.

Using the information collected from one or a plurality of information providers 6, the right holder 1 issues a warning to the trespassing unauthorized party, seeks a compensation for damage resulting from the infringement, demands signing of a license agreement by the party for royalty payment, or files an action for damages with the court. In such cases, the right holder 1 will strive to substantiate the infringement by utilizing as evidence claim charts, structural diagrams, circuit diagrams and operation manuals of the infringing product, as well as any other relevant material furnished by the information provider 6.

Suppose that following negotiations with or a lawsuit against the right-dispossessed party 2, the right holder 1 has succeeded in obtaining benefits such as royalties resulting lawfully from the right in question. In that case, the right holder 1 pays contingent fees to the server management company 4 as well as to the information provider 6. Specifically, the charge processing company 7 charges the right holder 1 fees to be paid to the server management company 4 and information provider 6. A fee may also be paid to the charge processing company 7 for the services rendered.

The amounts paid as contingent fees by the right holder 1 may be calculated as a percentage of the royalties or other benefits obtained in connection with the dispute.

Where there are a plurality of information providers 6, fees may be distributed equally to them all. Alternatively, the payment may be made solely to the information provider 6 who furnished the information that proved to be the most useful in negotiating with the trespassing unauthorized party 2.

As another alternative, information providers 6 may be rewarded according to their degrees of contribution. For example, suppose that an information provider A furnished the right holder 1 with information about a company X's product infringing on the right holder's lawful right while an information provider B offered information about a company Y's product also infringing on the right, and that the right holder 1 received ¥100,000,000 from the company X and ¥500,000,000 from the company Y in royalties. In such a case, a predetermined percentage (typically a few percentage points) of the royalties from the companies X and Y may be paid respectively to the information providers A and B.

FIG. 6 is a transaction diagram showing typical flows of information and money in the above-described system. In step SP1, the right holder 1 (i.e., registered party) gains access to the website of the server management company 4. The right holder 1 registers information about the right in his possession with the server management company 4. In step SP2, the right holder 1 transmits to the charge processing company 7 relevant information necessary for the company 7 to process-a registration fee to be withdrawn from the right holder's bank account or credit card account.

In step SP3, the charge processing company 7 withdraws an amount equivalent to the registration fee from the registered party's account and transfers the payment to the server management company 4.

In step SP4, the information provider 6 gains access to the server management company 4 and browses information entered by the registered party (right holder 1). If the information provider 6 is in possession of any information relevant to the browsed information, step SP5 is reached in which the information provider 6 notifies the server management company 4 of his willingness to offer information or transmits presumably useful information itself to the company 4. The server management company 4 forwards to the right holder 1 (registered party) the information offered by the information provider 6.

In step SP6, processing is performed to have a compensation paid for the offered information. More specifically, in step SP61, the charge processing company 7 transfers a reward for the information provided from the account of the right holder 1 to that of the information provider 6 while paying a commission to the server management company 4. Since the charge processing company 7 carries out charge processing services on behalf of the server management company 4, the charge processing company 7 may charge the server management company 4 an agent fee for taking over the services.

If the right holder 1 has successfully acquired benefits from the right in question using the offered information, step SP7 is reached in which payment of a contingent fee is processed. More specifically, in step SP71, the charge processing company 7 transfers the contingent fee from the account of the right holder 1 to that of the information provider 6 while paying a commission to the server management company 4 as well. In this case, too, the charge processing company 7 may charge the server management company 4 an agent fee for taking over the charge processing.

FIG. 7 shows a typical structure of hardware needed to let the right holder 1 and information provider 6 exchange information using the embodiment above. As described with reference to FIG. 1, the right holder 1 utilizes a data input apparatus illustratively composed of a personal computer in making entries about the right in his possession. The personal computer comprises: a transmitting-receiving element 21 such as a modem for connecting to a suitable network; a displaying element 22 for displaying information received by the transmitting-receiving element 21; an inputting element 25 made of a keyboard and/or a mouse used by the right holder 1 to register necessary information; a storing element 24 constituted by a hard disc drive, a memory, etc., for storing the information input through the inputting element 25 or received by the transmitting-receiving element 21; and a system controller 23 for controlling the transmitting-receiving element 21, displaying element 22, storing element 24 and other components.

The right holder 1 first gains access to the URL address of the website run by the server management company 4. Using the inputting element 25 made of the keyboard and/or the mouse, the right holder 1 then registers, on a registration screen not shown, such information as the identification number of the right in his possession, the applicable technical field, product field, filing date, and the right holder's addresses for contact such as an e-mail address and a telephone number.

The right holder's information thus input through the inputting element 25 made of the keyboard and/or the mouse is forwarded by the transmitting-receiving element 21 over the network to the server 5 for registration. The server 5 processes and edits the received registration information in such a manner that the information may be disclosed to and browsed by third parties at the website run by the server management company 4 as shown in FIG. 2.

As with the right holder 1, potential information providers 6 also use a data input apparatus composed of a personal computer to gain access to the URL address of the website run by the server management company 4 and browse through the registered information disclosed by the server 5.

The personal computer used by the information provider 6 is structurally the same as that employed by the right holder 1. That is, the computer has a transmitting-receiving element 31, a displaying element 32, a system controller 33, a storing element 34, and an inputting element 35 made of a keyboard and/or a mouse which correspond, respectively, to the transmitting-receiving element 21, displaying element 22, system controller 23, storing element 24, and inputting element 25 constituting the right holder's personal computer.

The information provider 6 browses through the registered information received from the server 5 over the network. If the information provider 6 believes he is in possession of useful information with regard to the registered information being read, the information provider 6 may operate the inputting element 35 made of the keyboard and/or the mouse to input his e-mail address and account number along with an outline or details of the information pertaining to a possible infringement. The input information is sent over the network 3 and registered with the server 5.

The server 5 is connected to a charge server 71 via the network 3. The server 5 feeds the charge server 71 with charge processing information whereby the right holder 1 is made to pay a registration fee for registering with the server 5, whereby each information provider 6 is paid a consideration for the information he has offered, and whereby a contingent fee is paid to the information provider 6 when the right holder 1 is paid royalties upon exposure of the infringement by use of the furnished information.

The above-described system allows the right holder 1 easily to expose and substantiate an infringement on his right and thus defend his lawful privileges successfully and profitably. The inventive system permits the information provider 6 to benefit from offering information in his possession. Information that would otherwise be deemed insignificant and left unused can thus be turned to profit. Using the system, the server management company 4 can stimulate circulation of information and thereby promote public interests. Furthermore, the inventive system permits prompt and equitable exchanges of money between the parties concerned because solicitation of information and payment of reward money are all handled by way of the server management company 4 or charge processing company 7.

In the description above, the registered party (right holder 1) was shown paying fees three times: upon registration, when receiving relevant information, and when acquiring benefits through exposure of an infringement on the right using the offered information. However, this payment scheme is not limitative of the invention. Illustratively the registration may be done free of charge. The potentially useful information may also be received free of charge for the moment because the actual value of the information is difficult to determine immediately.

The above embodiment has been described as a system that enables the right holder 1 to solicit infringement-related information from potential information providers 6. However, this is not limitative of the invention; the system may be applied to may other usages.

For example, a right holder 1 may wish to license third parties to practice his right or to sell the right itself. In such cases, it is generally difficult for the right holder 1 to find willing parties, which prevents the right from being exploited effectively and advantageously.

Using the inventive system then allows the right holder 1 to readily disclose his right and solicit interested parties either to sign a license agreement or a cross-license agreement on the right with the right holder 1 or to purchase the right itself from the right holder 1.

The system of the invention may be used by the right holder soliciting not only infringement-related information but also pieces of advice from experts such as lawyers on how to exercise the right holder's right upon discovering an infringement on the right. This feature is useful for any right holders having little specialized knowledge about how to practice their rights profitably.

Although the present invention has been discussed mostly in conjunction with the embodiment above, this is not limitative of the invention. Many variations are conceivable in terms of system configurations and charge processing flows. Illustratively, the server management company and the charge processing company may be organized into a single entity.

In detailing the embodiment, this specification has highlighted solicitation of information about possible infringement on rights such as patents. However, that aspect is not limitative of the invention. The invention also applies illustratively to soliciting information about cinemas, music, and other diverse topics of hobbies and pastimes, and to inviting expert views by physicians, lawyers and other specialists on medical or legal matters or about specific topics of other disciplines.

In one of such cases, the soliciting third party may even be a physician asking other specialized authorities or experts (i.e., information providers) for opinions on a medical matter that may turn out to be beyond his or her expertise.

With this invention, the information provider may be an individual or an investigation office. Investigation offices and similar research organizations may constantly browse websites set up as per the invention to pick up potentially lucrative business opportunities; they may take the initiative in finding cases to work on instead of waiting for potential clients to show up and ask for their expertise, as has been customary so far.

As described, one embodiment of this invention allows any right holder in possession of a lawful right to utilize a globally extended network in soliciting materials and information pertaining to a possible infringement on his right. This makes it possible efficiently to collect, or at least increase the possibility of collecting, relevant information and materials which are otherwise difficult to obtain. The right holder may gain significant profits by exposing and substantiating an infringement on his right using the appropriate information or material thus obtained.

The invention when suitably embodied also enables information providers to be paid for the information they may offer to the right holder. The inventive scheme thus constitutes a market that stimulates the circulation of information, knowledge, know-how or expertise in the possession of individuals, specialists or entities.

As many apparently different embodiments of this invention may be made without departing from the spirit and scope thereof, it is to be understood that the invention is not limited to the specific embodiments thereof except as defined in the appended claims.

What is claimed is:

1. An information providing apparatus comprising:
   first receiving means for receiving intellectual property rights information held by a registered party and entered by said registered party, and charge processing information for charging fees to said registered party;
   storing means for storing the intellectual property rights information which is entered by said registered party and received by said first receiving means;
   transmitting means for publicly transmitting to general public readers the intellectual property rights information stored in said storing means about said intellectual property right held by said registered party;
   second receiving means for receiving intellectual property right infringement-related information transmitted by a general public reader concerning possible infringement on said intellectual property right held by said registered party; and
   charge processing means for charging fees to said registered party based on the charge processing information received by said first receiving means and entered by said registered party, said charge processing means charging a contingent fee to said registered party if said registered party gains benefit from said intellectual property right information held by said registered party through the use of said intellectual property right infringement-related information provided by said general public reader, said contingent fee being paid to said general public reader.

2. An information providing apparatus according to claim 1, wherein said first receiving means and said second receiving means are constituted by a single receiving part.

3. An information providing apparatus according to claim 1, wherein said charge processing means charges said registered party a registration fee when said registered party enters said intellectual property right information.

4. An information providing apparatus according to claim 1, wherein said charge processing means charges said registered party a consideration fee, said consideration fee being paid to said general public reader for the intellectual property right infringement-related information provided by said general public reader.

5. A server apparatus comprising:
   first receiving means for receiving intellectual property rights information held by a registered party and entered by said registered party, and charge processing information for charging fees to said registered party;
   storing means for storing the intellectual property rights information which is entered by said registered party and received by said first receiving means;
   first transmitting means for publicly transmitting to general public readers the intellectual property rights information stored in said storing means about said intellectual property right held by said registered party;
   second receiving means for receiving intellectual property right infringement-related information transmitted by a general public reader concerning possible infringement on said intellectual property right held by said registered party; and
   charge processing means for charging fees to said registered party based on the charge processing information received by said first receiving means and entered by said registered party, said charge processing means charging a contingent fee to said registered party if said registered party gains benefit from said intellectual property right information held by said registered party through the use of said intellectual property right infringement-related information provided by said general public reader, said contingent fee being paid to said general public reader.

6. A server apparatus according to claim 5, wherein said first receiving means and said second receiving means are constituted by a single receiving part.

7. A server apparatus according to claim 5, wherein said first transmitting means and said second transmitting means are constituted by a single transmitting part.

8. A server apparatus according to claim 5, where said charge processing means charges said registered party a registration fee when said registered party enters said intellectual property right information held by said registered party.

9. A server apparatus according to claim 5, wherein said charge processing means charges said registered party a consideration fee, said consideration fee being paid to said general public reader for the intellectual property right infringement-related information provided by said general public reader.

10. An information processing method comprising allowing a registered party to register with a server about an intellectual property right information held by said registered party in order to solicit intellectual property right infringement related information from general public readers reading about said intellectual property right held by said registered party, said registered party enters charge processing information for charging fees to said registered party;

transmitting publicly to the general public readers the intellectual property rights information held by said registered party;

storing means for storing the intellectual property rights information which is entered by said registered party and received by said first receiving means;

receiving intellectual property right infringement-related information transmitted by a general public reader concerning possible infringement on said registered intellectual property right information held by said registered party; and charge processing for charging fees to said registered party based on the charge processing information entered by said registered party, said charge processing charges a contingent fee to said registered party if said registered party gains benefit from said intellectual property right information held by said registered party through the use of said intellectual property right infringement related information provided by said general public reader, said contingent fee being paid to said general public reader.

11. An information processing method according to claim 10, wherein said charge processing charges said registered party a registration fee when said registered party registers said intellectual property right information.

12. An information processing method according to claim 10, where in said charge processing charges said registered party a consideration fee, said consideration fee being paid to said general public reader for the intellectual property right infringement related information provided by said general public reader.

* * * * *